Nov. 27, 1928.

L. W. HALL 1,693,559

DEVICE FOR TAKING UP LOOSENESS IN BEARINGS

Filed Aug. 22, 1925

INVENTOR.
L. W. Hall.
BY Robb Robbitlee
ATTORNEY.

Patented Nov. 27, 1928.

1,693,559

UNITED STATES PATENT OFFICE.

LEO W. HALL, OF PERKINS TOWNSHIP, ERIE COUNTY, OHIO.

DEVICE FOR TAKING UP LOOSENESS IN BEARINGS.

Application filed August 22, 1925. Serial No. 51,745.

The present invention relates to a device for automatically taking up the wear in bearings, and has for its object to provide a device of this character which can be advantageously used in connection with the wrist pin bearings of internal combustion engines to take up wear automatically and prevent knocking of the engine.

Among the objects of the invention are to provide a device of this character which is simple and inexpensive in its construction, which is entirely automatic in its action, which will not interfere at all with the other parts of the engine, and which will prevent knocking when the bearing wears and thereby render it unnecessary to take down the engine as soon as the wrist pin bearings become slightly worn.

For a full understanding of the invention reference is to be had to the following description and accompanying drawings, in which, Figure 1 is a sectional view through a piston which is provided with a wrist pin bearing take up device constructed in accordance with the invention.

Corresponding and like parts are referred to in the following description and indicated on all of the views of the drawing by like reference characters.

Figure 1:
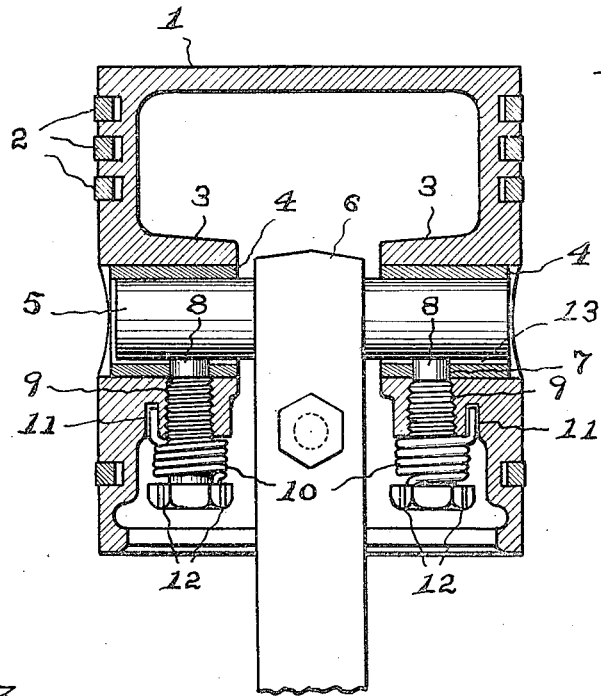

Referring to the drawings, the numeral 1 designates a piston which is shown as provided with the usual piston rings 2. Projecting into the piston from opposite sides thereof are the bosses 3 which receive the bearings 4, said bearings being formed of the usual metal which is used for such purposes.

The wrist pin 5 extends transversely across the piston, and has the ends thereof journaled in the bearings 4 in the usual manner, the metal portion of the wrist pin being engaged by the upper end of the piston rod 6. Each of the bearings 4 is provided at the lower side thereof with a lateral opening 7 which receives a bearing pin 8. These bearing pins may be formed of any suitable material, such as bronze, and the inner ends thereof are concave and shaped to fit the wrist pin. The outer ends of these bearing pins are engaged by adjusting screws 9 which are threaded in lateral openings provided in the bosses 3.

A helical spring 10 surrounds each of the adjusting screws 9, one end of each of the springs being extended laterally and received within a pocket 11 in the corresponding boss 3, while the opposite end of each of the springs is extended laterally and engaged by a selected one of a series of notches 12 which are formed in the head of each adjusting screw. After the adjusting screw has been brought into engagement with the bearing pin 8 the end of the helical spring can be engaged with the proper notch 12 to maintain the spring under sufficient tension to rotate the screw when there is any looseness in the bearing. The tension of the spring can be properly regulated and adjusted by causing the spring to engage the proper notch 12 for that purpose.

When the bearings 4 become worn, as indicated at 13 on the drawings, the adjusting screws 9 are automatically turned by the tension in the helical springs 10 to move the bearing pins 8 inwardly and take up any looseness. This prevents knocking and compensates for the wear without any necessity of taking the engine down.

Figure 3:
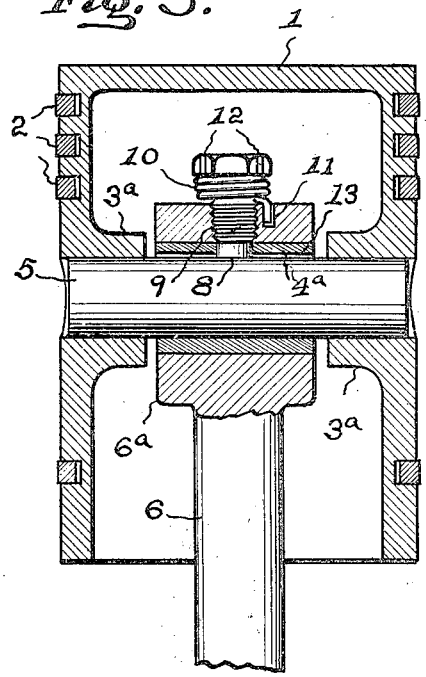
Figure 3 is a view similar to Figure 1, but showing a modification of the device which can be used when the wrist pin bearing is mounted in the piston rod instead of in the piston.
Figure 2:
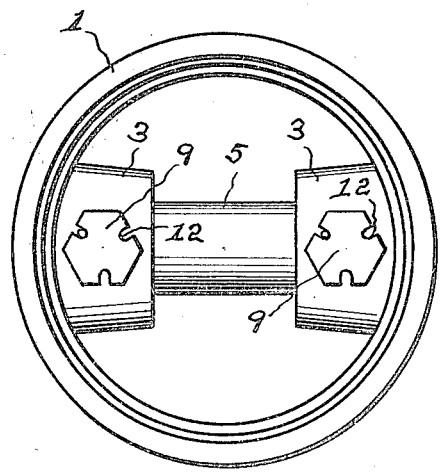
Figure 2 is a bottom view of the piston with the piston rod removed.

A slight modification is shown by Figure 3 in which the ends of the wrist pin 5 are seated in bosses 3ª projecting inwardly from opposite sides of the piston 1. The upper end of the piston rod 6 terminates in an enlarged head 6ª, which is provided with the wrist pin bearing 4ª. A bearing pin 8 is arranged within an opening formed in the upper side of the wrist pin bearing 4ª and this bearing pin is engaged by an adjusting screw 9 which is adapted to be turned automatically by the helical spring 10 to take up wear in the bearing. The adjusting screws are identical in construction and operation in the two forms of the invention. In both forms of the invention the wrist pin engages the bearings themselves upon the working stroke of the piston when it is moved downwardly by the firing of an explosive charge above the same, the pressure of the wrist pin being against the bearing pins 8 only on the return stroke of the piston which is not a working stroke.

It will be understood, of course, that if it is desired the device for taking up wear may be duplicated at the end of the connecting rod which engages the crank shaft, thereby providing for automatically taking up the wear in the bearings at opposite ends of the connecting rod.

Having thus described my invention what I claim as new and desire to secure by Letters Patent is:

A device of the character described, including a supporting boss, a tubular bearing arranged within the same and formed with a lateral opening, a main pin received within the tubular bearing, a bearing pin supplemental to the tubular bearing arranged loosely within the lateral opening of the tubular bearing and engaging the main pin, and adjusting screw threaded in the boss and engaging the bearing pin, said adjusting screw being formed with a head having a series of wire engaging notches therein, and a helical spring surrounding the adjusting screw and having one end thereof in engagement with the supporting boss while the other end thereof is in engagement with a selected notch in the head of the screw, whereby the spring can be placed under proper tension to automatically rotate the screw and progressively move the bearing pin inwardly and maintain it in engagement with the main pin to prevent looseness when the main bearing wears.

In testimony whereof I affix my signature.

LEO W. HALL.